March 16, 1948. W. F. JACKSON ET AL Re. 22,987

SAFETY CONTROL FOR GASEOUS FUEL BURNERS

Original Filed May 14, 1941 3 Sheets-Sheet 1

INVENTOR.
WILBUR F. JACKSON &
THOMAS H. JEFFERS

BY Albert J. Henderson
ATTORNEY.

March 16, 1948. W. F. JACKSON ET AL Re. 22,987

SAFETY CONTROL FOR GASEOUS FUEL BURNERS

Original Filed May 14, 1941 3 Sheets-Sheet 2

INVENTOR.
WILBUR F. JACKSON &
THOMAS H. JEFFERS
Albert J. Henderson
ATTORNEY.

March 16, 1948. W. F. JACKSON ET AL Re. 22,987

SAFETY CONTROL FOR GASEOUS FUEL BURNERS

Original Filed May 14, 1941 3 Sheets-Sheet 3

INVENTOR.
WILBUR F. JACKSON &
THOMAS H. JEFFERS

BY Albert J. Henderson
ATTORNEY.

Reissued Mar. 16, 1948

Re. 22,987

UNITED STATES PATENT OFFICE 22,987

SAFETY CONTROL FOR GASEOUS FUEL BURNERS

Wilbur F. Jackson, Compton, and Thomas H. Jeffers, Inglewood, Calif., assignors to Robertshaw-Fulton Controls Company, a corporation of Delaware Original No. 2,361,944, dated November 7, 1944, Serial No. 393,396, May 14, 1941. Application for reissue August 3, 1945, Serial No. 608,839½

27 Claims. (Cl. 158—117.1)

This invention relates to safety controls for gaseous fuel burners and more particularly to controls for domestic water heaters and the like.

Fuel controlling devices have been proposed to permit manual opening of the pilot burner fuel passage and automatic opening of the main burner line only after the pilot burner is lighted. In normal operation the fuel supply to the main burner is thermostatically regulated to maintain the water to be heated at a predetermined temperature. Should the flame of the pilot burner be extinguished for any reason, the fuel supply to both the main and pilot burners is shut off, and no fuel can flow through either burner until the device has been manually reset and the pilot burner relighted. Such safety devices have, however, involved the use of several valves which complicate the structure and detract from its efficiency in operation.

It is an object of this invention to reduce the number of parts required in such controls, while retaining the safety features thereof.

Another object of the invention is to ensure positive operation of the safety device when required.

Another object of the invention is to avoid incomplete shut-off of the fuel, such as may be due to deposit of dirt between the valve seating surfaces.

Another object of the invention is to shut off the flow of fuel to both the main and pilot burners when the safety control operates.

Another object of the invention is to prevent operation of any other manual control which may be provided until after the manually controlled pilot burner has been lighted and the automatic safety control is operating.

Another object of the invention is to combine shut-off, safety and thermostatic regulating devices into a simple, compact and reliable structure permitting economy in manufacture and facilitating installation and repair.

Other objects and advantages will become apparent from the following description taken in connection with the accompanying drawings, wherein Fig. 1 is a plan view of the improved control;

Figures 4, 5:
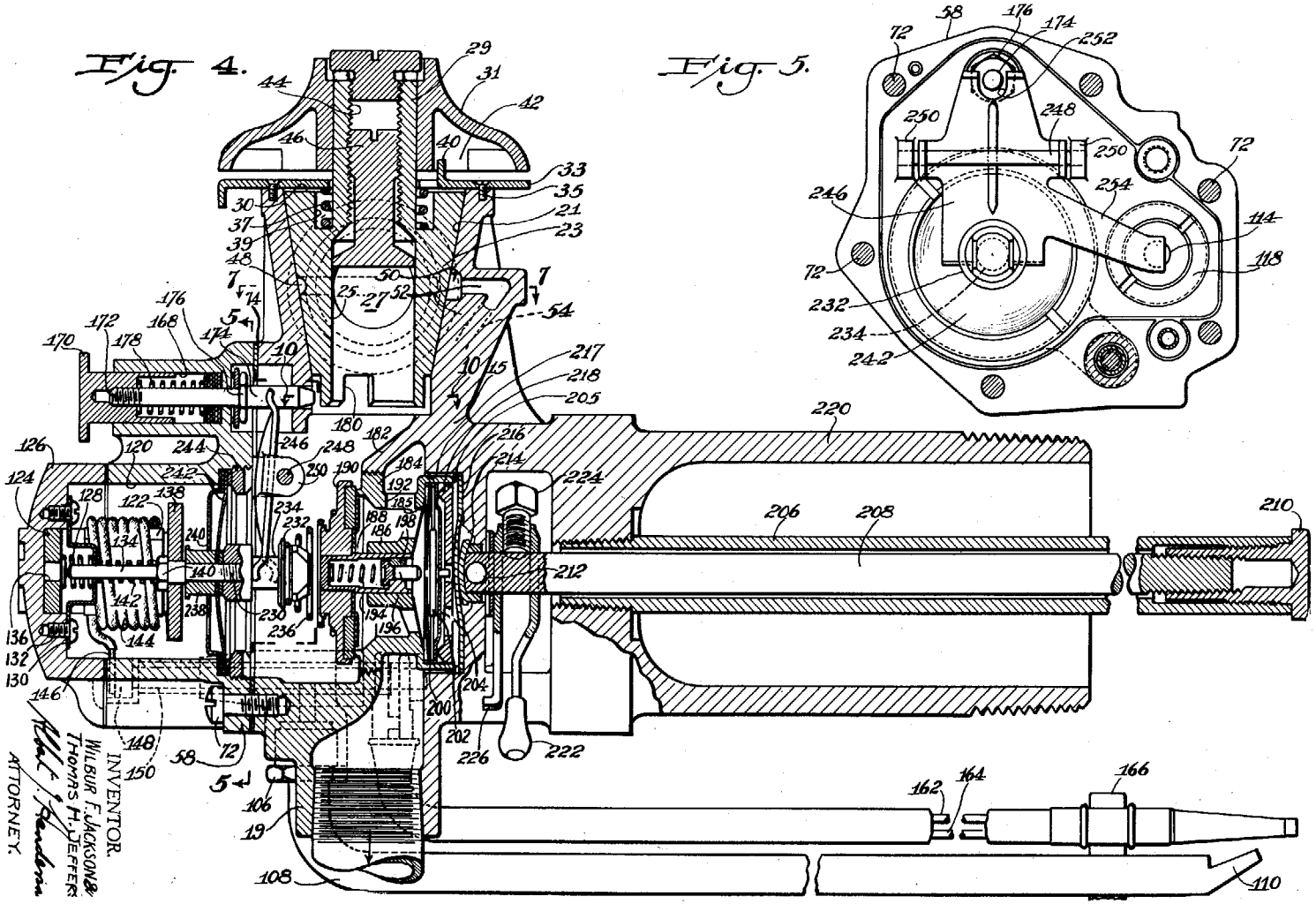
Fig. 4 is a longitudinal sectional view.
Fig. 5 is a section taken on the line 5—5 of Fig. 4 looking in the direction indicated by the arrows.
Figure 7:
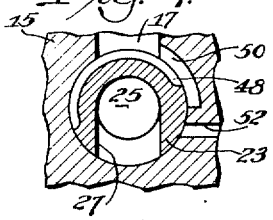
Figure 8:
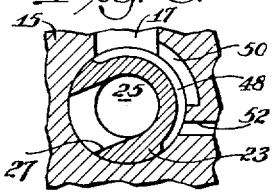
Figure 9:
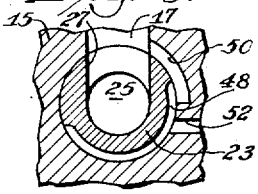
Figure 10:
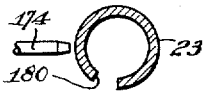
Figure 11:
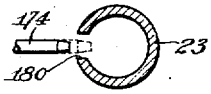
Figure 12:
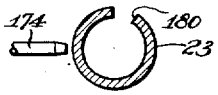

Figs. 7, 8 and 9 are partial sections taken along the line 7—7 of Fig. 4 and showing different positions of the shut-off valve; and Figs. 10, 11 and 12 are partial sectional views taken along the line 10—10 of Fig. 4, showing the relative positions of the interlocking device for the shut-off valve when the latter is in the positions of Figs. 7, 8 and 9, respectively.

Referring more particularly to the drawings, the control comprises a casing 15 provided at one end with a laterally extending intake nipple 17 and, at the other end with an outlet nipple 19 adapted to be connected by suitable piping with the main or heating burner of the water heater or other appliance (not shown).

The upper portion of the casing 15 is shaped to provide a tapered valve seat 21 within which a tapered plug cock 23 is seated. The plug cock 23 is provided with an axial bore 25 with which a port 27, extending through one wall of the cock 23, communicates. The port 27 affords communication between the inlet nipple 17 and the bore 25 in order that the fuel may flow into the body of the casing 15 when the cock is in the open position shown in Fig. 4.

The cock 23 is provided with a reduced stem 29 having a dial 31 mounted thereon against relative rotation and by means of which the cock 23 may be rotated in its seat 21. Movement of the cock 23 away from its seat is limited by a retainer plate 33 secured to the casing 15 by means of the screws 35 and overlying the shoulder 30 formed by the junction of the reduced stem 29 with the cock 23. A spring 37 is housed within a recess 39 at the junction of the stem 29 with the shoulder 30 and, by its engagement with the overlying portion of plate 33, serves to maintain the cock 23 resiliently in its seat 21. A stationary reference point in the form of a depending flange 38 on plate 33 is provided to cooperate with the dial 31 as hereinafter described to indicate the various positions of the cock 23.

Rotation of the cock 23 in its seat is limited to substantially 180° between full-open and full-closed positions by the provision of an upstanding flange 40 on the plate 33 which enters the underside of the dial 31 and engages with either end of an arcuate abutment 42 formed thereon. The stem 29 of the cock is provided with a threaded bore 44 for the reception of an adjustable plug 46 which extends into the bore 25 and serves to regulate the flow of fuel through the port 27.

The shut-off cock, which is constructed as described, is adapted for controlling fuel flow for both the main and pilot burners of the appliance. The pilot control includes an arcuate groove 48 formed in the seating surface of the cock 23 opposite the port 27. The seat 21 is provided with a similar but shorter arcuate groove 50 communicating with the inlet nipple 17. A passage 52 extends from the seat 21 adjacent the groove 50 and communicates with a passage 54 extending obliquely across the casing 15 and terminating in a horizontal passage 56.

Figure 1:
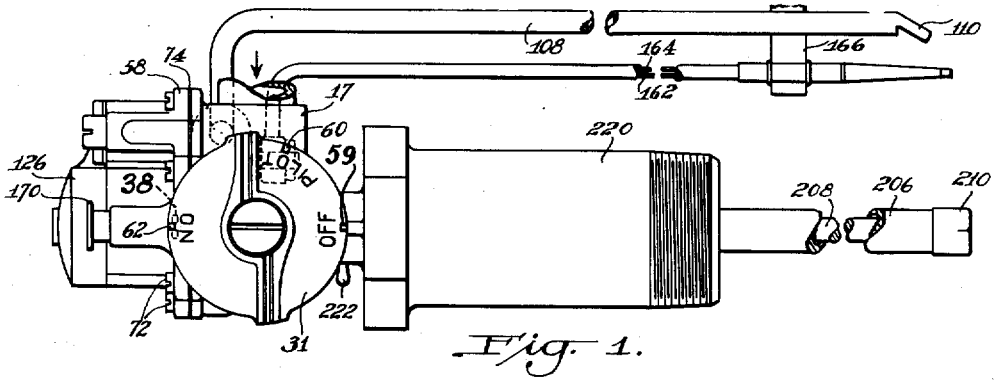
Figure 2:
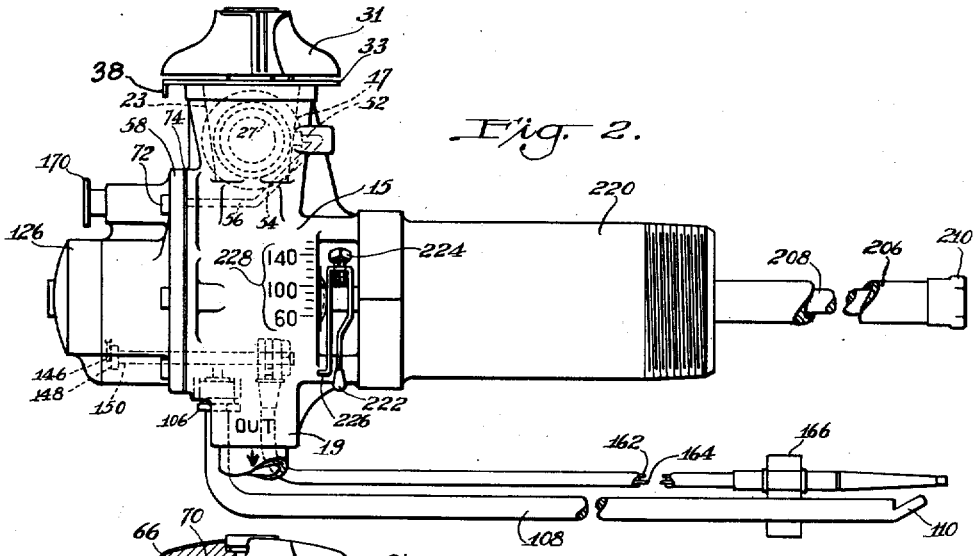
Fig. 2 is a side elevation.

By referring to Figs. 7, 8 and 9, the flow of fuel in various positions of the shut-off cock 23 may be ascertained. In Fig. 7 the cock is shown in closed position designated by a notch 59 on the edge of the dial 31 marked "Off" (Fig. 1) and there is no communication between the inlet nipple 17 and the port 27 or between the arcuate groove 48 and the passage 52. Upon being rotated from the closed position the cock first reaches the pilot position, designated by a notch 60 on the edge of the dial 31, marked "Pilot" (Fig. 1). This position is shown in Fig. 8 and the arcuate groove 48 is now in communication with the passage 52. The next position of the plug cock 23, upon further rotation, is the "on" position suitably designated by the notch 62 in the edge of the dial 31 and marked "On." This position is shown in Fig. 9 and the port 27 in the cock communicates with the inlet nipple 17 while at the same time communication between the passage 52 and the inlet nipple 17 is afforded by the arcuate groove 48 extending across both the passage 52 and the groove 50 in the valve seat.

Figure 3:
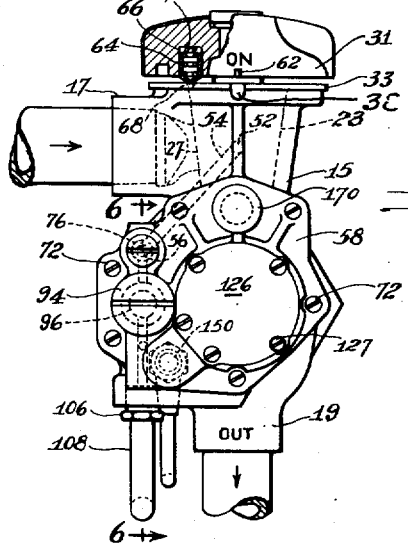
Fig. 3 is an end elevation.

In order to facilitate positioning of the dial 31 in the pilot position a non-positive stop is provided which, as shown in Fig. 3, comprises a plunger 64 mounted within an aperture 66 formed in the underside of the dial 31 and yieldably urged into engagement with a depression 68 in the plate 33 by means of the spring 70. Thus, the "on" and "off" positions of the shut-off cock are located by the positive stop and the pilot position by both an audible click and increased resistance to rotation of the dial afforded by the device described.

Figure 6:
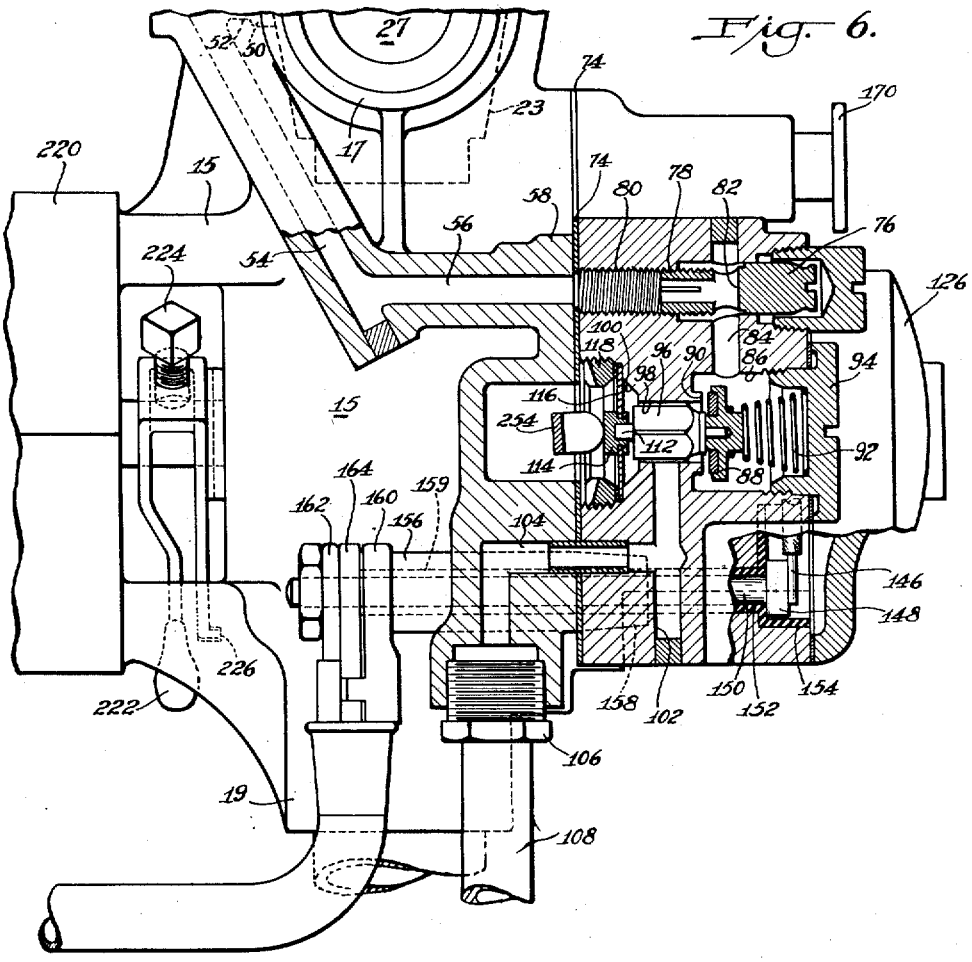
Fig. 6 is an enlarged section taken on the line 6—6 of Fig. 3 looking in the direction indicated by the arrows.

An end casing 58 is secured to the main casing 15 by means of the screws 72, and a gas-tight joint secured by the provision of a gasket 74 between these members. As shown in Fig. 6, the end casing 58 is provided with an adjustable plug 76 having a hollow threaded end 78 reciprocable in a threaded passageway 80 communicating with the passage 56 in the main casing. The hollow end of the plug 76 communicates with aperture 82 in the plug body which may be moved into and out of registry with a passage 84 formed in the end casing 58. As will be apparent, rotation of the threaded plug will increase or diminish the effective area of aperture 82 and adjust the amount of fuel that flows through the passage 84.

The passage 84 communicates with a chamber 86 within which a pilot control valve 88 is housed. The pilot control valve 88 may be of any suitable form and, in this instance, is shown as being of the poppet type adapted to be moved into and out of engagement with its seat 90 against the pressure of a coil spring 92 retained in the chamber 86 by the cap 94. The stem 96 of the pilot control valve 88 is suitably grooved to permit the passage of fuel therearound and is guided in an opening 98 formed in the end casing. A sealing chamber 100 receives the projecting end of the valve stem 96. Intermediate the chamber 100 and the valve seat 90 is an angular passage 102 communicating with a passage 104 formed in the main casing 15. The latter passage communicates through a suitable coupling connection 106 with a conduit 108 connected as shown in Fig. 4 with a pilot burner 110. In order that leakage of gas from the pilot control valve chamber 86 into the main casing 15 may be prevented the valve stem 96 is provided with a projection 112 which engages a cap 114 carried by a diaphragm 116 extending across the end of the sealing chamber 100 and secured in engagement therewith by means of the threaded collar 118. The cap 114 serves to reinforce the center portion of the diaphragm which receives the pressure of the operating parts.

As shown in Fig. 3, the pilot control valve assembly described is housed within part of the end casing 58 and is positioned to one side of the vertical axis of the main casing 15. That portion of the end casing 58 which is adjacent the vertical axis of the main casing 15 is provided with a chamber 120 (Fig. 4) within which a thermoelectric assembly is adapted to be housed. This assembly includes a horseshoe electromagnet 122 seated on its base 124 in an end cap 126 secured by screws 127 to the end casing 58 and forming a closure for the opening 120. In order to secure the magnet 122 yieldably in position and prevent distortion thereof, a coil spring 128 is held in position on the magnet base 124 by means of a magnet retainer 130 secured by means of the screws 132 to the end cap 126. A stem 134 extends between the legs of the magnet 122 and through the magnet retainer 130, there being an aperture 136 provided in the magnet base 124 to permit further extension of the stem during operation of the device. The stem carries an armature bar 138, abutting a flange 140 on the stem, and adapted to bridge the poles of the magnet 122 in the usual manner. An armature stem spring 142 extends between the nut 140 and the magnet retainer 130 and serves to urge the armature bar 138 away from the poles of the magnet 122. In order to prevent the spring 142 from unseating the magnet from the end cap 126, the spring 128 may be made considerably stronger than the spring 142.

The arms of the horseshoe electromagnet carry the coils 144 of a wire 146 which is connected by soldering or other suitable means to the head 148 of a terminal screw 150, the opposite end of the wire being secured to the magnet retainer 130. As shown in Fig. 6, the terminal screw 150 extends through the end cap 58 and emerges from the main housing 15 at a point behind the connection for the pilot burner conduit 108. The terminal screw 150 is insulated from the body of the casing by the sleeve 152 and the terminal insulator 154. A terminal sleeve 156 having a threaded end 158 is screwed into the end casing 58 around the insulating sleeve 152. A portion 159 of the insulating sleeve projects beyond the terminal sleeve and the terminal screw 150 projects still further. The projecting parts form terminals providing suitable electrical connection for the two elements, 160 and 162, of a thermocouple, these elements being separated at the terminals by means of the insulating washer 164.

The thermocouple may be supported by a bracket 166 in position to be heated by the pilot burner 110, thereby to establish an electric current to the coils 144 of sufficient strength to energize the magnet 122 and hold the armature bar 138 in contact with the pole faces thereof against the force of the spring 142, provided that the armature bar has been moved into contact with the magnet in a manner which will now be explained.

Formed in the end casing 58 immediately above the chamber 120 for the thermoelectric assembly and on substantially the same vertical axis, is a smaller chamber 168 within which a reset button 170 is slidably mounted. This reset button carries a reset stem 172 extending through an aperture in the bottom wall of the chamber 168 and having a projecting end 174 extending into the main casing 15 adjacent the tapered opening of the valve seat 21. The reset stem 172 is provided with a collar 176 between the stem and its projection 174. A coil spring 178 acts between the reset button 170 and the end wall of the opening 168 to urge the button outwardly from the opening, this movement being limited by the engagement of the collar 176 with the end wall. Thus the spring will cause return of the button 170 to the position shown in Fig. 4 after it has been manually depressed and released.

The projection 174 cooperates with the end of the shut-off cock 23 to prevent manual actuation of the reset button 170 except when the cock is in one position. The three positions of full-closed, pilot and full-open with the position of the projection 174 are shown in Figs. 10, 11 and 12, respectively. To this end, the cock is provided with a slot 180 which is so related to the arcuate groove 48, inlet nipple 17 and aperture 52 previously described, that when the dial is moved to the pilot position the slot will be aligned with the projection 174 of the reset stem, as shown in Fig. 11.

This invention is particularly directed toward the provision of but a single valve for providing both thermostatic control of the main burner and safety control of the flow of fuel thereto should the pilot burner become extinguished. Accordingly, the body of the main casing 15 is of hollow form below the portion carrying the plug cock 23 and is provided with a web 182 within which an annular valve seat member 184 is removably mounted. The annular valve seat 184 carries a hollow boss 186, connected thereto by a perforated flange 185, and within which a hollow valve stem 188 is slidably mounted. A valve member 190 is secured on the valve stem 188 and cooperates with the valve seat 184 to control the flow of fuel through the ports 192 in the valve seat to the outlet nipple 19, with which these ports are aligned. It will be observed that the valve assembly is axially aligned with the thermoelectric assembly with which it is operatively associated.

The hollow valve stem 188 contains a spring 194 which serves to urge a plunger 196 into contact with a plug 198 closing the inner end of the hollow valve stem. The reduced end of the plunger 196 projects through the plug and is adapted to engage and be operated by a clicker mechanism comprised of a pair of opposed fulcrum levers 200, fulcrum button 202 and clicker disc 204, all of which are housed within a recess 205 formed in the annular valve seat 184.

Thermostatic means for operating the valve 190 through the clicker disc mechanism is provided and consists of an element of the rod-and-tube type. A tube 206 of material having a high coefficient of expansion is securely mounted at its inner end on the casing 15. The rod 208 of the thermo-responsive unit, which is of material having a low coefficient of expansion, extends within the tube 206 and is threadedly connected at its outer end with a plug 210 anchored in the outer end of the tube 206. The inner end of the rod 208 is recessed for the reception of a ball 212 secured in position by means of a cap 214. The cap 214 engages a sealing disc 216 secured in a recess 217 in the casing 15 by the valve seat 184 and having its inner portion urged into engagement with a thrust member 218 by the cap member 214.

As is well known, the differential in the expansion of the rod and tube under the influence of the heat of the water in which the device is mounted causes the rod to actuate the thrust member 218 to operate the clicker disc 204 which, in turn, operates the fulcrum button 202 and the opposed fulcrum levers 200. The levers 200 strike the plunger 196 which actuates the valve member 190 to open position, it being noted that the spring 194 is not compressed at this time as will be apparent hereinafter. Suitable means for mounting the control in the water heater or other appliance are provided by the elongated boss 220 projecting from the casing around the rod and tube element. The temperature at which the valve 190 will be operated may be adjusted by means of a manually operated lever 222 attached to the rod 208 by means of the set screws 224. The lever carries a pointer 226 for cooperation with indicia 228 on the casing. Movement of the lever in a vertical direction will serve to rotate the rod 208 and screw this rod further in or out of the plug 210 to change the expansion differential.

Movement of the valve 190 toward and away from its seat by the thermostatic device is governed by the condition of the thermoelectric mechanism previously described. Such governing action is effected by the provision of valve operating mechanism for the thermoelectric assembly which will now be described. The armature stem 134 is provided beyond the armature bar 138 with an extension having a threaded end 230. Mounted on the end 230 is an abutment member 232 having an annular recess 234 intermediate its ends. The abutment member 232 is suitably grooved to receive one end of a spring 236, the other end of which engages with the valve 190 urging it toward its seat.

The threaded extension 230 of the armature stem also carries a collar 238 slidably mounted within a guide disc 248 which, together with a flexible sealing disc 242 carried on the stem, is securely retained in position across the end of the chamber 120 by means of the threaded collar 244. As will be apparent, the function of the sealing disc 242 is to prevent the entrance of fuel into the magnet chamber 120, while at the same time permitting free movement of the armature bar toward and away from attracted position with the poles of the magnet 122.

Extending between the projecting end 174 of the reset stem and the recess 234 in the abutment member 232 is a pivoted lever 246. As shown in Fig. 5, this lever is pivotally mounted intermediate its ends on a pin 248 carried by spaced lugs 250 on the inner face of the end casing 58. The end of the lever adjacent the reset stem extension 174 is curved to slidably engage with the collar 176 thereof, there being a slot 252 formed in the lever to permit it to extend around the extension 174 for this purpose. The opposite end of the lever is also slotted to extend around the recessed portion 234 of the abutment 232 and is similarly curved for slidable engagement with the walls of the recess 234. The lever 246 is further provided on one side with a radially extending arm 254 which is adapted to engage at its outer end with the cap member 114.

To operate the control from the "off" position on the dial, as shown in Fig. 7, the dial is first rotated to the "pilot" position. Until this position is reached, no gas can pass the shut-off cock and both the pilot and the main burner control valves are in closed position.

In the "pilot" position, as shown in Fig. 8, the fuel may flow from the inlet nipple 17 by way of the arcuate groove 48 to the pilot passage 52 and thence to the pilot control valve 88 which, as stated, is in the closed position. At this time the slot 180 in the lower portion of the shut-off cock 23 is in alignment with the extension 174 of the reset stem 172. The reset button 170 is then manually actuated to depress the stem 172 and cause the extension 174 to enter the slot 180, as shown in dotted lines in Fig. 11. When the reset button is thus operated, the collar 176 on the stem 172 engages the curved end of the lever 246 and moves it in a clockwise direction, as viewed in Fig. 4, around the pin 248 as the fulcrum.

While the reset button is thus being actuated, the pilot control valve 88 is moved off its seat by the engagement of the lateral arm 254 with the cap 114 on the end of the valve stem. Hence, gas is allowed to flow past the pilot control valve 88 and through the passages 102 and 104 to the pilot burner 110. The pilot burner may then be lighted and the flame size adjusted by operation of the adjusting screw 76. Due to the central pivoting of the lever 246 the lower end thereof will move in the opposite or clockwise direction when reset button 170 is depressed. Thus the lower end of the lever 246 acts against the left-hand wall of the recess 234, as viewed in Fig. 4, and forces the armature bar 138 against the pole faces of the magnet 122. The flame from the pilot burner impinges upon the end of the thermocouple which is connected in series with the coil 144 of the electromagnet 122.

In a short time the thermocouple generates sufficient current to energize the magnet and maintain the armature bar 138 in contact with the pole faces thereof. The reset button may then be released but the lever 246 remains in pivoted position being maintained by the recess 234 in such position. Consequently, the lateral arm 254 continues to hold the pilot control valve 88 in open position and the abutment 232 remains stationary and spaced from the valve member 190. The position of the parts is as shown in Fig. 4, where the control device is in the operating position and the valve 190 free to be moved off its seat by the thermostatic control to permit flow of gas in the main burner.

To cause gas to flow to the main burner, the dial must be moved to the "on" position, as shown in Fig. 4 and Fig. 9, permitting gas to flow from the inlet nipple 17 through the port 27 of the gas cock into the main body of the casing 15. In this position it will be observed that the groove 50 permits gas to flow to the pilot burner by connecting groove 48 with the inlet 17. The indicator lever 222 may be set to the desired temperature indicated on the casing and the control will then be in complete operation.

As previously described in part the rod 208 of the thermostatic means will actuate the valve 190 with a snap action through the clicker mechanism provided. The movement of the plunger 196 which effects opening of the valve moves the spring 194 bodily without compressing it due to this spring being strong enough to overcome the spring 236 and the force resulting from the gas pressure on top of the valve. The spring 194 is provided to permit the fulcrum levers to move under thermostatic operation when the valve is being held closed by the safety mechanism.

In the event that the pilot burner is extinguished, the thermocouple ceases to generate current, causing deenergization of the electromagnet and movement of the armature bar 138 away from the pole faces. Such movement of the armature bar is caused by the spring 142 which urges the abutment 232 toward the valve member 190. If the thermostatic mechanism is operating at this time to hold the valve 190 in open position, movement of the abutment 232 will serve to close it. Such action is due to the spring 142 on the armature stem being stronger than the spring 194 in the valve stem and thus overcoming it to move the valve 190 to closed position. During this movement of the abutment 232 toward the right, as viewed in Fig. 4, the lever 246 is rotated on its pivot 248 in a counter-clockwise direction. The laterally extending arm 254 moves away from the cap 114 on the pilot control valve and the spring 92 for this valve moves it to closed position. Thus, when the pilot burner is extinguished for any reason the safety mechanism operates to close both the main control valve 190 and the pilot control valve 88, giving a complete shut-off.

It will be apparent that if an attempt were made to set the safety mechanism in any other than the correct way, as outlined hereinbefore, the construction of the control would prevent such operation from being carried out. The reset button 170 cannot be depressed if the dial is in any position other than the "pilot" position. The parts are constructed and arranged so that the end of the reset stem extension 174 will strike the flange on the bottom of the shut-off cock 23 before the collar 176 on the stem can engage the upper end of the lever 246. Thus, neither the main control valve nor the pilot control valve can be opened with the dial in any other than the "pilot" position.

It will be appreciated that the valve 190 is operated by the thermostatic mechanism under normal conditions but this mode of operation is supplanted by that of the electric control whenever conditions demand. If the thermostatic control, is holding the valve 190 off its seat and the safety mechanism comes into operation, the thermoelectric control overcomes the action of the thermostatic control, causing closure of both the main and pilot valves as described. Thus, the thermoelectric control is, in effect, a governor for the thermostatic control which normally operates the valve controlling fuel flow to the burner.

In controls where two or more valves are used in place of the single valve described and shown herein, the thermostatic valve is usually in constant operation but the safety valve is called upon to function only infrequently. It is apparent that unless abnormal conditions arise the safety valve has no occasion to operate. As this safety valve usually remains stationary for long periods of time it becomes incapable of functioning efficiently when called upon to do so. An infrequently operated valve is subject to gumming due to the drying of lubricants and also to dirt from the gas being deposited on the seating surfaces. Such condition of the safety valve would not be discovered until the resulting leakage became apparent. In the device described and shown herein, the single valve is in constant operation as a thermostatic valve and, when the thermoelectric safety device becomes operative, it acts upon this valve also. Closure of this valve by the safety control is readily accomplished due to the absence of dirt on the seating surfaces and the operative condition in which the valve has been retained. It may be noted that the continual opening and closing of such a valve will tend to make it self-cleaning.

The embodiment of the invention herein shown and described is to be regarded as illustrative only, and it is to be understood that various modifications and changes may be made within the scope of the appended claims without departing from the spirit of this invention.

We claim:

1. In a safety control for gaseous fuel burners, the combination of a main fuel valve movable between positions for controlling supply of fuel to the burner, a control valve positioned normal to said main valve for intercepting the supply of fuel to the burner, electromagnetic means in axial alignment with said control valve and adapted to govern the operation thereof, manually actuable means extending substantially parallel with the axis of said control valve and into the path of movement of said main valve to set said electromagnetic means for governing operation, said manually actuable means being operable in only one position of said main valve, and a pivoted member extending between said electromagnetic and manually actuable means for transmitting movements of one to the other.

2. In a safety control for gaseous fuel burners, the combination of a main fuel valve, a thermally operated control valve intercepting the supply of fuel, a pilot burner having communication with said main fuel valve, means responsive to the presence of a flame at said pilot burner for governing the operation of said control valve, manually actuable means for setting said flame responsive means for governing operation, means for preventing operation of said manually actuable means when said main fuel valve is in open position, and manually actuable means to set the temperature at which said control valve will be operated.

3. In a safety control for gaseous fuel burners, the combination of a main fuel valve, a thermally operated control valve intercepting the supply of fuel to the burner, thermoelectric means adapted to govern the operation of said control valve, manually actuable means to set said thermoelectric means for governing operation, means for preventing operation of said manually actuable means when said main valve is in open position, and manually actuable means to set the temperature at which said control valve will be operated.

4. In a safety control for gaseous fuel burners having main and pilot burners, the combination of a main fuel valve governing the supply of fuel to both the main and pilot burners, means for controlling the supply of fuel from the main valve to the main burner, means for controlling the supply of fuel from the main valve to the pilot burner, biasing means for each controlling means urging the same to a position where fuel supply is prevented, thermoelectric means energizable by said pilot burner and having an armature movable to attracted position, manually actuable means for simultaneously moving said armature and operating said pilot burner, means for overcoming the biasing means for the main controlling means and operating said means to permit fuel supply to the main burner, and means associated with said armature and movable therewith into and out of operative engagement with said main controlling means for permitting operation of said main controlling means to supply fuel to the main burner only when said armature is in attracted position.

5. In a safety control for gaseous fuel burners having main and pilot burners, the combination of a main fuel valve, a main control valve intercepting the supply of fuel to the main burner, a pilot control valve intercepting the supply of fuel to the pilot burner, thermoelectric means energizable by said pilot burner and having an armature movable to attracted position, manually actuable means for simultaneously moving said armature and operating said pilot control valve, means permitting operation of said main control valve to supply fuel to said main burner only when said armature is in attracted position, and means associated with said main fuel valve permitting operation of said manually actuable means only when said main valve is in one position.

6. In a safety control for gaseous fuel burners having main and pilot burners, the combination of a main fuel valve, a thermally operated valve intercepting the supply of fuel to the main burner, a pilot burner control valve intercepting the supply of fuel to the pilot burner, thermoelectric means energizable by said pilot burner and having an armature movable to attracted position, manually actuable means for simultaneously moving said armature and operating said pilot control valve, means permitting operation of said thermally operated valve to supply fuel to said main burner only when said armature is in attracted position, and means associated with said main fuel valve permitting operation of said manually actuable means only when said main fuel valve is in one position.

7. In a safety control for gaseous fuel burners having main and pilot burners, the combination of a main fuel valve having a pilot position, a thermally operated valve intercepting the supply of fuel to the main burner, a pilot burner control valve intercepting the supply of fuel from said main fuel valve to the pilot burner, thermoelectric means energizable by said pilot burner, an armature for said thermoelectric means movable between free and attracted positions, means extending between said armature and said thermally operated valve to retain said valve in a closed position when said armature is free, manually actuable means for simultaneously moving said armature to attracted position and operating said pilot control valve to open position, and means associated with said main fuel valve permitting operation of said manually actuable means only when said main fuel valve is in pilot position.

8. In a safety control for gaseous fuel burners having main and pilot burners, the combination of a main control valve for the main burner, a pilot control valve for the pilot burner, biasing means for each valve urging the same to closed position, thermally responsive means for overcoming the main valve biasing means and actuating said valve to open position, spring means interposed between said thermally responsive means and said main valve, safety means operable in opposition to said thermally responsive means and in cooperation with said biasing means upon the main valve to compress said spring and reverse the position of said main valve from open to closed, means for opening the pilot control valve and actuating the safety means to a position permitting the thermally responsive means to actuate the main valve, and means responsive to the presence of a flame at the pilot burner for holding the last said means in said position.

9. In a fuel control device, the combination of a casing forming a conduit supplying fuel to a main burner, a pilot burner having a fuel supply connection separate from the conduit, a valve mounted in the casing for controlling the flow of fuel in the conduit, snap-acting means biasing said valve to a position where passage of fuel to the main burner is prevented, thermostat means associated with the snap-acting means and responsive to heat fluctuations caused by the main burner for reversing the position of said snap-acting means and holding the valve in a position where passage of fuel to the main burner is permitted, and separate valve closing means responsive to absence of heat from the pilot burner to overpower the thermostat means and reestablish the biased position of the valve, said means comprising a plunger cooperable with the snap-acting means for moving the valve to biased position, a magnet for holding the plunger in position to permit reversal of the position of the snap-acting means, and a thermocouple exposed to the heat of the pilot burner for energizing the magnet.

10. In a safety control for gaseous fuel burners, the combination of means movable between positions for controlling the supply of fuel to the burner, actuating means for said fuel controlling means positioned for operation on one side thereof, means biasing said fuel controlling means to a first position where supply of fuel to the burner is prevented, yieldable means interposed between said controlling means and actuating means and having a stronger bias than said biasing means, thermally responsive means adapted to exert a force upon said actuating means for overcoming said biasing means and thereby operating said controlling means from said first to a second position where fuel supply is permitted, and thermally responsive means adapted to exert sufficient force upon said controlling means from the opposite side to said actuating means to cause return of said controlling means from said second to said first position to cut off the fuel supply to the burner, said yieldable means being adapted to absorb the force of the first said thermally responsive means upon said return operation.

11. A safety control for fuel burners having main and pilot burners, comprising a body member having a passage for fuel, a valve seat in said body defining the inlet and outlet sides of said passage, a valve member engageable with said seat for controlling flow of fuel from the passage to the main burner, actuating means for said valve member positioned in spaced relation thereto for operation from one side of said seat, yieldable means interposed between said actuating means and valve member and operative to vary said relation, thermally operable means responsive to the main burner for causing operation of said actuating means to disengage said valve from its seat while said yieldable means remains inoperative to vary said relation, and means responsive to the absence of heat at pilot burner adapted for operative engagement with said valve member from the opposite side of said seat for returning said valve member into engagement with said seat, said yieldable means becoming operative to vary said relation thereby permitting said valve member to return irrespective of operation of said actuating means tending to continue said disengagement thereof.

12. In a safety control for fuel burners having main and pilot burners, comprising a body member having a passage for fuel, a valve seat in said body defining the inlet and outlet sides of said passage, a valve member engageable with said seat for controlling flow of fuel from the passage to the main burner, actuating means for said valve member positioned in spaced relation thereto for operation from one side of said seat, means biasing said valve member toward said valve seat and operable from the opposite side of said seat relative to said actuating means, yieldable means interposed between said valve member and actuating means and having a stronger bias than said biasing means, said yieldable means being operative to vary said relation, means thermally responsive to operation of the main burner operatively engaging said actuating means to exert a force thereon for overcoming said biasing means and disengaging said valve member from said seat, said yieldable means remaining inoperative to vary said relation during said disengaging operation, and means thermally responsive to operation of the pilot burner adapted for operative engagement with said valve member from said opposite side of said valve seat for returning said valve member into engagement therewith in the absence of heat at the pilot burner, said yieldable means becoming operative to vary said relation thereby permitting said valve member to return irrespective of disengaging operation of said actuating means.

13. In a burner control device having an outlet for supplying fuel for a main burner and a pilot outlet for supplying fuel for a pilot burner, a shutoff valve having an "on" position for the supply of fuel to the main burner and to the pilot burner, a "pilot" position shutting off the supply of fuel to the main burner and permitting the supply of fuel to the pilot burner, and an "off" position shutting off the supply of fuel to both the main burner and the pilot burner, thermoelectric safety shutoff means, means for operating said first mentioned shutoff valve, reset means for resetting said thermoelectric safety shutoff means independently of the operating means for said first mentioned shutoff valve when said valve is in pilot position, and means for preventing the resetting operation of said reset means when said first-mentioned shutoff valve is in "on" position.

14. In a burner control device having an outlet for supplying fuel for a main burner and a pilot outlet for supplying fuel for a pilot burner, a shutoff valve having an "on" position for the supply of fuel to the main burner and to the pilot burner, a "pilot" position shutting off the supply of fuel to the main burner and permitting the supply of fuel to the pilot burner, and an "off"

position shutting off the supply of fuel to both the main burner and the pilot burner, thermoelectric safety shutoff means, means for operating said first mentioned shutoff valve, reset means for resetting said thermoelectric safety shutoff means independently of the operating means for said first mentioned shutoff valve when said valve is in pilot position, and means for preventing the resetting operation of said reset means when said first-mentioned shutoff valve is in "on" position and also when said first mentioned shutoff valve is in "off" position.

15. In a burner control device having an outlet for supplying fuel for a main burner and a pilot outlet for supplying fuel for a pilot burner, a shutoff valve having an "on" position for the supply of fuel to the main burner and to the pilot burner, a "pilot" position shutting off the supply of fuel to the main burner and permitting the supply of fuel to the pilot burner, and an "off" position shutting off the supply of fuel to both the main burner and the pilot burner, thermoelectric safety shutoff means, means for operating said first mentioned shutoff valve, reset means for resetting said thermoelectric safety shutoff means independently of the operating means for said first mentioned shutoff valve when said valve is in pilot position, and means for preventing the resetting operation of said reset means when said first mentioned shutoff valve is in "on" position, said last means comprising stop means operable with said first mentioned shutoff valve and positioned to prevent movement of said reset means when said first mentioned shutoff valve is in "on" position and clear of said reset means to permit movement of said reset means when said first mentioned shutoff valve is in "pilot" position.

16. In a burner control device having an outlet for supplying fuel for a main burner and a pilot outlet for supplying fuel for a pilot burner, a shutoff valve having an "on" position for the supply of fuel to the main burner and to the pilot burner, a "pilot" position shutting off the supply of fuel to the main burner and permitting the supply of fuel to the pilot burner, and an "off" position shutting off the supply of fuel to both the main burner and the pilot burner, thermoelectric safety shutoff means, means for operating said first mentioned shutoff valve, reset means for resetting said thermoelectric safety shutoff means independently of the operating means for said first mentioned shutoff valve when said valve is in pilot position, and means for preventing the resetting operation of said reset means when said first-mentioned shutoff valve is in "on" position, said last means comprising stop means operable with said first mentioned shutoff valve and positioned to prevent movement of said reset means when said first mentioned shutoff valve is in "on" and "off" positions and clear of said reset means to permit movement of said reset means when said first mentioned shutoff valve is in "pilot" position.

17. In a burner control device having an outlet for supplying fuel for a main burner and a pilot outlet for supplying fuel for a pilot burner, thermoelectric safety shutoff means, a shutoff valve mounted for turning movement and having an "on" position for the supply of fuel to the main burner and to the pilot burner, a "pilot" position shutting off the supply of fuel to the main burner and permitting the supply of fuel to the pilot burner, and an "off" position shutting off the supply of fuel to both the main burner and the pilot burner, reset means having rectilinear movement for resetting said thermoelectric safety shutoff means, and a stop member mounted to turn with said shutoff valve, said stop member being movable into position preventing rectilinear movement of said reset means when said shutoff valve is turned to position for supplying fuel for the main burner and when said shutoff valve is turned to "off" position, said stop member being movable to position clear of said reset means to permit rectilinear resetting movement thereof when said shutoff valve is turned to "pilot" position.

18. In safety control means of the character described, a valve body having an outlet for supplying fuel to a main burner and an outlet for supplying fuel to a pilot burner associated with the main burner, thermoelectric safety shutoff means to be energized by heat derived from the pilot burner, reset means for resetting said shutoff means, a valve controlling flow of fuel to said main burner outlet and to said pilot outlet movable to a first position establishing flow of fuel to both of said outlets and to a second position cutting off flow of fuel to said main burner outlet while establishing flow of fuel to said pilot burner outlet, and stop means carried by said valve for movement therewith and cooperating with said resetting means effective for preventing the resetting operation except when said valve is in its said second position.

19. In safety control means of the character described, a valve body having an outlet for supplying fuel to a main burner and an outlet for supplying fuel to a pilot burner associated with the main burner, thermoelectric safety shutoff means to be energized by heat derived from the pilot burner, reset means for resetting said shutoff means, a valve controlling flow of fuel to said main burner outlet and to said pilot outlet movable to a first position establishing flow of fuel to both of said outlets and to a second position cutting off flow of fuel to said main burner outlet and to a third position cutting off flow of fuel to both of said outlets, and stop means carried by said valve for movement therewith and cooperating with said resetting means effective for preventing the resetting operation in said first and third positions of said valve while enabling the resetting operation in said second position of said valve.

20. In safety control means of the character described, a valve body having an outlet for supplying fuel to a main burner and an outlet for supplying fuel to a pilot burner associated with the main burner, thermoelectric safety shutoff means to be energized by heat derived from the pilot burner, reset means for resetting said shutoff means, a valve controlling flow of fuel to said main burner outlet and to said pilot outlet, said valve being mounted for turning movement to a first position establishing flow of fuel to both of said outlets and to a second position cutting off flow of fuel to said main burner outlet while establishing flow of fuel to said pilot burner outlet, and a stop member fixed to said valve for turning therewith and cooperating with said resetting means effective for preventing the resetting operation except when said valve is in its said scond position.

21. In safety control means of the character described, a valve body having an outlet for supplying fuel to a main burner and an outlet for supplying fuel to a pilot burner associated with the main burner, thermoelectric safety shutoff means to be energized by heat derived from the pilot burner, reset means for resetting said shutoff means, a valve controlling flow of fuel to said main burner outlet and to said pilot outlet, said valve being mounted for turning movement to a first position establishing flow of fuel to both of said outlets and to a second position cutting off flow of fuel to said main burner outlet while establishing flow of fuel to said pilot burner and to a third position cutting off flow of fuel to both of said outlets, and a stop member fixed to said valve for turning therewith and cooperating with said resetting means effective for preventing the resetting operation in said first and third positions of said valve while enabling the resetting operation in said second position of said valve.

22. In a burner control device having an outlet for supplying fuel to a main burner and an outlet for supplying fuel to a pilot burner associated with the main burner, thermoelectric safety shutoff means to be energized by heat derived from the pilot burner, reset means for resetting said shutoff means, a valve mounted for turning movement on an axis separate from the axis of said thermoelectric safety shutoff means into a first position for supplying fuel for both of said outlets and a second position for supplying fuel for said pilot burner outlet only, and means carried by said valve and cooperating with said resetting means effective for holding said resetting means against resetting operation when said valve is in its said first position and releasing said resetting means for resetting operation when said valve is in its said second position.

23. In a device of the class described, a valve body having a generally conical bore, a hollow generally conical plug seated in said bore, said valve body having an inlet passage opening into said bore and an outlet passage leading from said bore, a port in the wall of said plug opening through the wall of said plug into the interior of the plug, said port being adapted to be moved into register with said inlet by turning the plug, said plug having a pilot supply port adapted to register with said inlet passage when said first mentioned port is out of register with said inlet passage, a pilot supply passage for supplying fuel for a pilot burner from said pilot supply port when said pilot supply port is in register with said inlet passage, a thermoelectric safety shutoff valve mounted in said valve body in series with said valve plug, reset means for resetting said thermoelectric safety shutoff valve, and stop means mounted to turn with said valve plug and cooperable with said reset means to prevent the resetting operation of said reset means except when said plug is in position with said pilot supply port in register with said inlet passage.

24. In a device of the class described, a valve body having a generally conical bore, a hollow generally conical plug seated in said bore, said valve body having an inlet passage opening into said bore and an outlet passage leading from said bore, a port in the wall of said plug opening through the wall of said plug into the interior of the plug, said port being adapted to be moved into register with said inlet by turning the plug, said plug having a pilot supply port adapted to register with said inlet passage when said first mentioned port is out of register with said inlet passage, a pilot supply passage for supplying fuel for a pilot burner from said pilot supply port when said pilot supply port is in register with said inlet passage, a thermoelectric safety shutoff valve mounted in said valve body in series with said valve plug, reset means for resetting said thermoelectric safety shutoff valve, stop means mounted to turn with said valve plug and cooperable with said reset means to prevent the resetting operation of said reset means except when said plug is in position with said pilot supply port in register with said inlet passage, and stop means on said valve body for cooperation with said last mentioned stop means to limit turning movement of said plug.

25. In a device of the class described, in combination, a valve body, a thermoelectric safety shutoff valve mounted in said valve body, an electromagnet mounted in said valve body and comprising a magnet frame and an armature having a bias to a retracted position, said armature being operable when attracted to said magnet frame to overcome said bias and free said thermoelectric safety shutoff valve for movement to open position and, when retracted, causing movement of said thermoelectric safety shutoff valve under said bias to closed position, a housing for said electromagnet, a reset member operable relatively to said electromagnet housing and having rectilinear sliding movement in said valve body for resetting said armature to attracted position and freeing said thermoelectric safety shutoff valve for movement to open position, a spring cooperable with said reset member for returning said reset member to its outwardly projected position, a shutoff valve mounted for turning movement in said valve body, and a stop member mounted to turn with said last mentioned valve and having position obstructing rectilinear resetting movement of said reset member when said last mentioned valve is in a predetermined position.

26. In a burner control device having an outlet for supplying fuel for a main burner and an outlet for supplying fuel for a pilot burner associated with the main burner, a valve body, a thermoelectric safety shutoff valve mounted in said body yieldingly urged in closing direction, a stem for said valve, an electromagnet mounted in said valve body having an armature provided with a stem having abutting engagement with the valve stem and operable when attracted to said electromagnet to free said valve for movement to open position, said armature being biased so that when released from said electromagnet, said armature is adapted to cause closing of said valve, a housing for said electromagnet, a reset member operable relatively to said housing yieldingly urged outward thereof and having rectilinear sliding movement inward of said valve body for resetting said armature to attracted position and freeing said valve for movement to open position, a second valve mounted in said valve body for turning movement into a first position for supplying fuel for both the main burner outlet and said pilot burner outlet and a second position for supplying fuel for the pilot burner outlet only, and stop means carried by said second valve effective in cooperation with said reset member for preventing the resetting operation when said second valve is in its said first position while permitting the resetting operation when said second valve is in its said second position.

27. In a burner control device having an outlet for supplying fuel to a main burner and an outlet for supplying fuel to a pilot burner associated with the main burner, a thermoelectric safety shut-off valve, a turn-valve mounted for turning movement on an axis separate from the axis of said thermoelectric safety shut-off valve into a first position for supplying fuel for both of said outlets and a second position for supplying fuel for said pilot burner outlet only, reset means mounted on the control device in position externally of said turn-valve for resetting said thermoelectric safety shut-off valve for movement to open position, means responsive to the heat of the pilot flame for closing said thermoelectric safety shut-off valve in the absence of said flame, and means carried by said turn-valve and cooperating with said reset means for holding said reset means against resetting operation when said turn-valve is in its said first position and releasing said reset means for resetting operation when said turn-valve is in its second position.

WILBUR F. JACKSON.
THOMAS H. JEFFERS.